United States Patent [19]
Mauk et al.

[11] Patent Number: 6,140,380
[45] Date of Patent: Oct. 31, 2000

[54] BLOWING AGENT AND METHOD FOR PRODUCING FOAMED POLYMERS AND RELATED COMPOSITIONS

[76] Inventors: Jeffrey L. Mauk, 1709 Lewis La., St. Louis, Mo. 63012; Kenneth G. Mauk, 1141 Sateen Dr., St Louis, Mo. 63131

[21] Appl. No.: 09/277,525

[22] Filed: Mar. 26, 1999

[51] Int. Cl.$^7$ ........................................................ C08J 9/00
[52] U.S. Cl. .................................. 521/85; 516/11; 516/18; 521/82; 521/83; 521/92; 521/100; 521/103; 521/142; 521/146; 521/182; 521/183; 521/184
[58] Field of Search ................................. 521/85, 96, 83, 521/82, 92, 142, 146, 182, 183, 184, 100, 103; 516/11, 18

[56] References Cited

U.S. PATENT DOCUMENTS

| | | |
|---|---|---|
| 3,933,514 | 1/1976 | Banks et al. . |
| 3,961,972 | 6/1976 | Sparlin et al. . |
| 4,057,519 | 11/1977 | Summers et al. . |
| 4,848,465 | 7/1989 | Hazlett . |
| 5,242,494 | 9/1993 | Callaghan et al. . |
| 5,246,654 | 9/1993 | Ertle et al. . |
| 5,424,337 | 6/1995 | Bedel et al. . |
| 5,501,826 | 3/1996 | Ertle et al. . |
| 5,539,005 | 7/1996 | Bedel et al. . |
| 5,612,386 | 3/1997 | Ertle et al. . |

OTHER PUBLICATIONS

Modern Plastics Encyclopedia, Oct. 1980, vol. 57, No. 10A, pp. 200–204, 214–221 and 300–310.

Specification Sheet for *Cylacell: Endothermic Blowing Agent*, by Cylatec, 3711 Whipple Ave. N.W., Canton, Ohio 44718, date unknown.

*Primary Examiner*—Morton Foelak
*Attorney, Agent, or Firm*—Howell & Haferkamp, L.C.

[57] ABSTRACT

A silicate-based blowing agent and method for producing foamed polymers provides a blowing agent containing at least one metal silicate, boric acid or a salt thereof, a peroxy compound, a reaction initiator and, optionally, a desiccant. The blowing agent is prepared by mixing the ingredients at least one time and allowing the mixture to rest without mixing until a dry dilatent gel is formed. The blowing agent is useful for the production of foamed polymers, especially for the production of foamed rubber.

10 Claims, No Drawings

BLOWING AGENT AND METHOD FOR PRODUCING FOAMED POLYMERS AND RELATED COMPOSITIONS

BACKGROUND OF THE INVENTION

1. Field of the Invention

The present invention relates to blowing agents for the production of foams and methods for the use of these blowing agents, and more particularly to silicate-based blowing agents for the production of foamed polymers and methods for the use of these silicate-based blowing agents.

2. Description of the Related Art

The use of blowing agents to create foamed polymers is well known. (See, e.g., Modern Plastics Encyclopedia, 57 (10A): 200–203, 214–221, 300–310, October 1980, McGraw-Hill Inc., New York, N.Y., which pages are incorporated herein by reference). Blowing agents are usually either gases that are dispersed throughout the polymer by high shear mixing or by injection under pressure, or are liquids or solids that are dispersed throughout the polymer and generate gas by chemical decomposition or evaporation. All blowing agents result in the formation of gas-filled cells throughout the polymer. The cells result in the formation of a sponge or foam structure that has a lower bulk density than the solid polymer.

Blowing agents that generate gas after their incorporation into the polymer are termed "in situ" blowing agents. They function by chemical decomposition of the blowing agent or because of a phase change from a solid or liquid to a gas phase under the conditions of the blowing step. An advantage of in situ blowing agents is that they do not require the energy-intensive step of incorporating gas into a polymer by high shear mixing or by high pressure injection. Another advantage is that foaming can be initiated after injecting the polymer into a mold so that molded foamed products can be produced.

Chlorofluorocarbons (CFC's) are commonly used as in situ blowing agents for the manufacture of synthetic foams. Likewise, azo- compounds, such as 1-1'azobisformamide (ABFA) or azide compounds, such as 4,4'-oxybis (benzenesulfonylhydrazide), which generate nitrogen upon chemical decomposition, are often used in foamed rubber manufacture. Both CFC's and the nitrogen-forming azo- and azide compounds, however, have disadvantages. CFC's have been identified as participating in the destruction of the earth's ozone layer and azo- and azide blowing agents can form nitrosamines, which have been shown to cause unwanted health effects. Furthermore, conventional azo- and azide blowing agents also require a relatively high blowing temperature and are often required in relatively high concentrations to obtain a given degree of foam expansion—especially with foamed rubbers.

One alternative to CFC's and nitrogen-forming blowing agents is the use of silicate-based materials. The use of silicates to form rigid foams is well known and has been reported in, for example, U.S. Pat. Nos. 3,933,514, 3,961,972 and 4,848,465.

Rigid, open cell silicate foams having good compressive strength were reported in U.S. Pat. No. 5,242,494, to Callaghan et al. The foamable composition contained at least 20% by weight of an metal silicate (and preferably 35% to 40%), a blowing agent (which could be hydrogen peroxide), a surfactant and a hardener that was capable of liberating acetic or formic acid under the conditions of foaming. It was reported to be advantageous to include a water-dispersible polymer in the foamable composition under certain circumstances, however, no rubbers were said to be useable and only rigid foams were produced.

Summers et al., in U.S. Pat. No. 4,057,519, disclosed a rigid foam with improved flame retardance at a lower cost than conventional flame retardant additives. The improvement was obtained by the inclusion of aqueous sodium silicate in a composition with an hydroxyl-terminated polyester, a polyisocyanate prepolymer, a halogenated alkane blowing agent and a catalyst, such as tin, an amine, or paratoluenesulfonic acid.

In U.S. Pat. Nos. 5,246,654 and 5,501,826, Ertle et al. describe the production of dense, free-flowing alkali metal silicate-based particles, which, when heated to a temperature of from about 250° to 1100° F., expand to form rigid, lightweight foamed particles. The particles are formed from liquid sodium or potassium silicate with the addition of some combination of magnesium silicate, calcium carbonate and/or boric acid or sodium borate pentahydrate, or Portland cement. The expanded rigid particles are said to be useful for thermal or acoustical insulators, as well as for bulking agents for concrete or gypsum.

More recently, Ertle et al., in U.S. Pat. No. 5,612,386 (which is incorporated by reference herein), have disclosed the use of silicate compositions similar to those described above as blowing agents for thermoplastic and thermoset polymers, or as accelerators or initiators for other organic blowing agents. The blowing agents were prepared by mixing an alkali metal silicate solution with hydrous magnesium silicate and boric acid solution and evaporating water until a solid material was obtained. The solid material was comminuted and further dried to form the blowing agent.

As Ertle et al. explain, in the production of a foamed thermally processable polymer, such as rubber, the polymer will only capture and hold gas bubbles during a relatively short interval in its processing. Gas is captured after the polymer has cured sufficiently to provide the necessary film strength and viscosity required for gas capture, and gas capture continues until the film strength and viscosity exceed a limit where the cells will rupture and can no longer hold gas. But gas that is generated by the blowing agent before the polymer has entered, or after the polymer has passed through, the gas capture window is lost. The period of time in which gas is captured within the polymer to form a foam is termed the "gas capture window". Because azide blowing agents generate gas at a slow and steadily increasing rate, much of the gas that they are capable of generating is produced either before or after the gas capture window. This has been cited as a reason why a relatively high concentration of these azides is needed to achieve a given amount of cell volume. (See, e.g., Cylacell, Elidothermic Blowing Agent, informational product literature from Cylatec, 3711 Whipple Ave., N.W., Canton, Ohio 44718). This phenomena results in a reduction in blowing efficiency. As used herein, the term "blowing efficiency" means the amount of the gas generated by a given concentration of a blowing agent that is captured within the cells of the foam relative to the total amount of gas that is generated by the blowing agent.

An advantage that is described for one silicate-based blowing agent is that it generates gas within a much narrower time and temperature window than is typical for azides. (See, e.g., the Cylacell™ product literature referenced above). When the conditions for gas generation by the silicate-based blowing agent are adjusted to coincide with the gas capture window of a polymer, it is claimed that the silicate-based blowing agent exhibits a blowing efficiency that is several times higher than typical azo- or azide blowing agents. However, in order to obtain this increased efficiency, the gas generation peak of the blowing agent must be adjusted to coincide with the gas capture window of the polymer. Since this matching requires adjustment of blowing conditions and the composition of the blowing stock, it often requires trial and error testing. Gas generation that occurs either before or after the gas capture window of the polymer could result in very low gas capture, yielding an unsatisfactory foam. Since it is common for many additives to be blended with a polymer during compounding, it would not unusual for the gas capture window of polymers to vary somewhat from batch to batch. Such variation could cause either inconsistent gas capture efficiency in silicate-based blowing agents having a narrow gassing period, or could require an untoward amount of trial and error testing. This problem may be especially noticeable in polymers having a limited gas capture window, such as many rubbers.

Accordingly, it would be useful to provide a blowing agent for polymers, especially for rubbers, that gave the same bulk density of the foamed polymer as conventional azo- and azide blowing agents, but at lower levels of use. It would be useful if this blowing agent were also easily dispersible throughout the polymers during compounding. Moreover, it would also be useful if this blowing agent had a lower activation temperature than conventional azo- and azide blowing agents, and known silicate-based blowing agents, and also demonstrated consistent blowing efficiency, especially when used to produce foamed rubbers.

BRIEF SUMMARY OF THE INVENTION

Briefly, therefore, the present invention is directed to a novel blowing agent comprising at least one metal silicate, boric acid or a salt thereof, a peroxy compound, a reaction initiator and water.

The present invention is also directed to novel blowing agent consisting essentially of the reaction product of at least one metal silicate, boric acid or a salt thereof, a peroxy compound, a reaction initiator and water.

The present invention is also directed to a novel method for preparing a blowing agent comprising mixing together to form a reaction mixture at least one metal silicate, boric acid or a salt thereof, a peroxy compound, a reaction initiator and water.

The present invention is also directed to a foamable composition comprising at least one metal silicate, boric acid or a salt thereof, a peroxy compound, a reaction initiator and water intermixed throughout a foamable polymer.

The present invention is also directed to a process for preparing a foamed polymer from a foamable composition having an activation temperature and comprising at least one metal silicate, boric acid or a salt thereof, a peroxy compound, a reaction initiator, water, and optionally, a desiccant, intermixed throughout a foamable polymer, the process comprising heating the foamable composition to its activation temperature thereby causing the foamable composition to generate gas, thus creating gas cells throughout the polymer resulting in a foamed polymer.

The present invention is also directed to a foamed polymer having a density of between about 4 lbs/cu ft. and about 40 lbs/cu ft., in which the foamed structure has been formed by the blowing agent as set forth above.

Among the several advantages found to be achieved by the present invention, therefore, may be noted the provision of a blowing agent for polymers, especially rubbers, that gives the same bulk density of the foamed polymer as conventional azo- and azide blowing agents, but at lower levels of use; the provision of such a blowing agent that is also easily dispersible in polymers during compounding; and the provision of such a blowing agent that has a lower activation temperature than conventional azo- and azide and known silicate-based blowing agents and demonstrates consistent blowing efficiency, especially when used to produce foamed rubbers.

DETAILED DESCRIPTION OF THE PREFERRED EMBODIMENTS

In accordance with the present invention, it has been discovered that a novel blowing agent for the production of foamed polymers can be prepared by mixing at least one metal silicate, boric acid or a salt thereof, a peroxy compound, a reaction initiator, water and, optionally, a desiccant. When these components are mixed together into a reaction mixture and allowed to interact, a dry, dilatent gel material is formed that demonstrates the desirable properties described above. The novel blowing agent has been found to be especially useful in the production of foamed rubbers. Because it is silicate-based, as opposed to being an azo- or azide, which form nitrogen by decomposition at elevated temperature, it does not result in the formation of undesirable nitrosamines during the blowing process. Moreover, it has been found to provide the same level of foam density as a conventional azo- or azide blowing agent, but at lower use rates. For example, only one-third to one-fourth as much of the subject blowing agent is required to produce a foam having a given bulk density compared with the amount of a conventional azo- or azide blowing agent.

Surprisingly, it has been found that the subject blowing agent has a softening or melting point at a temperature of about 140° F., whereas other known silicate blowing agents remain solids at that temperature. This lower softening or melting temperature has been found to significantly increase the ease and thoroughness of dispersing the blowing agent throughout the polymer to be foamed.

Furthermore, it has surprisingly been found that the temperature at which significant gas generation by the novel blowing agent begins (the "activation temperature") is substantially lower than for most azo-, azide and other silicate-based blowing agents. For example, the activation temperature for the subject blowing agent is about 240° F., compared with about 290° F. to over 300° F. for typical low-temperature azo- and azide blowing agents and known silicate blowing agents.

The novel blowing agent has been found to be particularly useful for the production of foamed rubbers compared with other known silicate-based blowing agents. Without wishing to be bound by this or any other theory, it is believed that this utility may be due to its lower activation temperature and different gassing rate pattern as compared with known silicate-based blowing agents, which are understood to result in more consistent gas capture by the expanding gas cells of the rubber during its curing period.

As noted above, the blowing agent of this invention is prepared by mixing together at least one metal silicate, boric acid or a salt thereof, a peroxy compound, a reaction initiator and water. It is known that more than one type of metal silicate may be used together in the composition of the present invention. As used herein, the term "metal silicate" means any alkali metal silicate or alkaline earth metal silicate or blend thereof having a general formula of $M_2O \cdot SiO_2$, where M is an alkali metal or alkaline earth metal. Preferred metal silicates have an $M_2O:SiO_2$ molar ratio of at least about 2:3. The preferred metal silicate is one that forms the dry dilatent gel product, as described in detail below, when an effective amount of the metal silicate is mixed with boric acid or a salt thereof, a peroxide compound, water and a reaction initiator, as are hereinafter described.

Illustrative of alkali metal silicates and alkaline earth metal silicates that are useful as a component of the subject blowing agent are sodium silicate, potassium silicate, magnesium silicate, calcium silicate and mixtures thereof. A preferred metal silicate is sodium silicate. More preferred is a mixture of sodium silicate and magnesium silicate.

Metal silicates that are useful in the present blowing agent can be supplied as the anhydrous form of the compound, the hydrated form, or as the silicate in aqueous solution. It is preferred, however, that the silicate be supplied in the form of a hydrate or an aqueous solution.

The boric acid or borate salt used in the preparation of the blowing agent can be supplied as, for example, borohydride, boric acid, or alkali metal or alkaline earth metal salts of boric acid. Illustrative of such boric acid salts are the metaborate, metaborate tetrahydrate, metaborate peroxyhydrate, tetraborate, tetraborate decahydrate and tetraborate pentahydrate salts of lithium, sodium, potassium, magnesium and calcium.

In the preparation of the novel blowing agent, the metal silicate can be supplied as a mixture with the boric acid or borate salt. For example, one such preferred mixture is a mixture of sodium silicate, magnesium silicate and borohydride, boric acid, or alkali metal or alkaline earth metal borate salts. More preferred is a mixture of sodium silicate, magnesium silicate and sodium borate pentahydrate wherein sodium silicate is the major component with lesser amounts of magnesium silicate and sodium borate pentahydrate. Yet more preferred is a mixture of sodium silicate and magnesium silicate and sodium borate pentahydrate wherein the mixture comprises from about 60% to about 98% of sodium silicate, from about 0.5% to about 39% magnesium silicate and from about 0.5% to about 10% sodium borate pentahydrate, all on a dry weight basis. Even more preferred is a mixture of sodium silicate and magnesium silicate and sodium borate pentahydrate wherein the mixture comprises about 90% sodium silicate, about 6% magnesium silicate and about 4% sodium borate pentahydrate, all on a dry weight basis. A most preferred source of metal silicate and boric acid or salt thereof is a commercial product that is identified as Cylacell™ that is available from Cylatec, 3711 Whipple Ave., N.W., Canton, Ohio 44718.

It is not critical that the metal silicate or the boric acid or salt thereof be of any particular grade of purity. Any such material having a purity equivalent to technical grade run-of-the-trade commercial product is sufficient for the present blowing agent. Other materials and contaminants may be present in relatively small amounts, but it is preferred that no contaminant be present at a level that interferes with the formation of the novel dry dilatent gel product, or with the property of such product to generate gas under conditions at which it would be normally expected to perform as a blowing agent.

The peroxy compound of the novel blowing agent can be any compound having a peroxy functionality. It is preferable that the peroxy compound that is used in the subject blowing agent is one that can form the dry dilatent gel product that is described in detail below when an effective amount of the peroxy compound is mixed with the metal silicate, the boric acid or borate salt and water, which dry dilatent gel product is capable of producing gas in situ at about 240° F. when it also contains the reaction initiator that is described below.

Some examples of peroxides that are useful in the preparation of the subject blowing agent are hydroperoxides, such as hydrogen peroxide, t-butyl hydroperoxide and cumene hydroperoxide; diacyl peroxides, such as di-benzoyl peroxide, di-isononanoyl peroxide, cumyl peroxyneodecanoate, lauroyl peroxide and decanoyl peroxide; ketone peroxides, such as methyl ethyl ketone peroxide and 2,4 pentanedione; peroxyesters, such as 1-amyl peroxyneodecanoate, 1-butyl peroxyneodecanoate, 1-butyl peroxypivalate, t- butyl peroxyneodecanoate, t-butyl peroxypivalate, 2,5 dimethyl-2,5-bis (2-ethyl-haxanoyl-peroxy) hexane, t-butyl peroctoate, t-butyl peracetate and t-butyl perbenzoate; dialkyl peroxides, such as dicumyl, 2,5-dimethyl-2,5-bis (t-butylperoxy) hexane, di-t-butyl peroxide and 2,5-dimethyl-2,5-bis (t-butylperoxy) hexyne-3; peroxydicarbonates, such as di (n propyl) peroxide, diisopropyl peroxide, di (sec-butyl) peroxide and di (2-ethylhexyl) peroxide; peroxyketals, such as 1,1-bis (t-butylperoxy)-cyclohexane; peroxy acids, such as t-butyl peroxy maleic acid; acyl alkylsulfonyl peroxides, such as acetyl cyclohexyl-sulfonyl peroxide; alkyl monoperoxydicarbonates; and mixtures of two or more of these.

Although a peroxide of any type can be used, it is preferred that the peroxide be hydrogen peroxide. A preferred form for supplying hydrogen peroxide is as an aqueous solution of hydrogen peroxide; more preferred is an aqueous solution of 3% by weight hydrogen peroxide. Such aqueous solution of hydrogen peroxide can also contain small amounts of stabilizers, such as, for example, 0.001% by weight phosphoric acid. Hydrogen peroxide of any commercial grade of purity is acceptable for use in the novel blowing agent, but it is preferred that any aqueous solution of hydrogen peroxide be substantially free of contaminants that would serve to catalyze the decomposition of hydrogen peroxide at temperatures of less than about 200° F.

The reaction initiator of the novel blowing agent can be any alkali metal hydrogen carbonate. Illustrative of reaction initiators that are useful in the present blowing agent are sodium hydrogen carbonate (sodium bicarbonate), lithium hydrogen carbonate and potassium hydrogen carbonate. A preferred reaction initiator is sodium bicarbonate and the commercial dry powder form of sodium bicarbonate that is known as baking soda is even more preferred.

It has surprisingly been found that the inclusion of an effective amount of the reaction initiator with the metal silicate, boric acid or borate salt, water and the peroxy compound during mixing accelerates the formation of the desired dry dilatent gel blowing agent product over the rate of formation of such product in the absence of the reaction initiator. This acceleration in the rate of formation of the product is obtained without losing any capability of the blowing agent to generate gas. Such acceleration is beneficial because smaller equipment can be used to prepare the blowing agent and the preparation process can be completed in less time; thus, increasing the throughput for a given set of process equipment.

Furthermore, it has surprisingly been found that the inclusion of an effective amount of the reaction initiator as a component of the novel blowing agent permits a reduction in blowing temperature for the blowing agent. By way of example, whereas the blowing temperature of Cylacell™ is typically above 300° F., and blowing temperatures for even low temperature azo- and azide blowing agents are typically above about 250° F.–260° F., a typical blowing temperature for the subject blowing agent is about 240° F. The benefits of a lower blowing temperature are reduced thermal degradation of the rubber or other polymer being foamed, reduced requirement for energy to heat the batch during processing, and smaller heating equipment that is required for shorter times. Without wishing to be bound by this or any other theory, it is believed that the lower activation temperature for the novel blowing agent causes the gas generation reaction to occur, or at least to begin, at a lower temperature and to proceed along a different overall gassing rate pattern than is the case for silicate-based blowing agents not having the composition of the subject product. It is further believed that the gassing pattern that results more closely matches the gas capture window of some polymers, especially rubbers, possibly by better accommodating some degree of batch-to-batch, or product-to-product variation in the occurrence of the gas capture window. It is believed that this improved matching causes a higher overall gassing efficiency for the subject blowing agent.

It should be understood that carbonates, such as, for example, calcium carbonate, do not provide the same desirable accelerating function as do the alkali metal hydrogen carbonates of the present invention. Calcium carbonate, for example, does not moderate the gassing rate pattern of a silicate-based blowing agent as does, for example, sodium bicarbonate.

Optionally, a desiccant can be a component of the novel blowing agent. As used herein, the word "desiccant" includes compounds and composition that can bind free water. However, it is not known whether such desiccants actually act to bind such water in the dry dilatent gel blowing agent or in the foamed polymer. Calcium oxide and aluminum sulfate in dry powder form are preferred for use as a desiccant and aluminum sulfate is more preferred.

Such materials can be supplied in any commercial grade and the presence of small amounts of contaminants does not substantially alter the performance of the desiccant.

Thus, the subject blowing agent includes at least one type of metal silicate, boric acid or a borate salt, a peroxy compound, a reaction initiator and water. In fact, the blowing agent consists essentially of the reaction product of these ingredients. One method of preparing the novel blowing agent is by mixing together the components that are described above to form a reaction mixture. It is preferred that the mixing is carried out in a suitable manner and by using suitable equipment, both of which will now be described.

It is preferred that the mixing is carried out in a manner that avoids contacting the reaction mixture with metal. The equipment that is used to mix the components of the blowing agent is preferably non-metal, or of the type that all exposed surfaces that come in contact with the components are clad with some non-metallic material. Some of the components of the blowing agent seem to bind tightly with metal surfaces and could be removed from the mixture unintentionally if metal mixing equipment is used. Illustrative of such useful non-metallic materials are plastics, glass and ceramics. Plastics are more preferred. An example of a preferred plastic is polyethylene.

Any type of mixing equipment can be used to mix the components of the blowing agent, provided that it has non-metallic mixing surfaces and is of the type that is conventionally used to blend moderate-to-high viscosity liquids, pastes or gels. In small batches, the blowing agent may be prepared in plastic cups, beakers or pails by mixing with a plastic stirring rod. The mixing can be done by hand or can be carried out with a powered agitator. In larger applications, preferred mixers are heavy-duty agitated tanks, can mixers, kneader mixers, Banbury mixers, ribbon blenders and the like.

One preferred combination of ingredients for the preparation of the subject blowing agent is to use sodium silicate and magnesium trisilicate pentahydrate as the at least one metal silicate and to use sodium tetraborate pentahydrate as the boric acid or salt thereof. When these ingredients are used, they are intermixed in the following proportions for products in which there is no desiccant (all amounts refer to parts by weight of the stated ingredient per 100 parts of the total weight of all ingredients): preferably from about 39 to about 48 parts sodium silicate, from about 2 to about 3 parts of magnesium trisilicate pentahydrate, from about 4 to about 5 parts sodium tetraborate pentahydrate, from about 1 to about 4 parts of the peroxy compound, from about 0.5 to about 4 parts of the reaction initiator and enough water to make up 100 parts. When hydrogen peroxide is used as the peroxy compound and sodium bicarbonate is the reaction initiator, the preferred relative amounts of ingredients are about 43 parts sodium silicate, about 2.5 parts of magnesium trisilicate pentahydrate, about 4 parts of sodium tetraborate pentahydrate, about 1.5 parts of hydrogen peroxide, about 2 parts of sodium bicarbonate and with enough water to make up 100 parts of the mixture. It has been found that surprisingly superior results are provided when the relative amounts of ingredients are about 49 parts metal silicate, about 1.5 parts peroxy compound, about 2 parts of reaction initiator and with water supplied to make up 100 parts of the mixture. Contaminants and other optional ingredients can be included in the mixtures given above at the expense of water, as long as the contaminants or optional ingredients do not interfere with the formation of the desired dry dilatent gel or alter the blowing action of the composition in an undesirable manner.

When Cylacell™ is the source of silicate and boric acid or borate, the blowing agent can be prepared by mixing from about 46 to about 52 parts of Cylacel™, from about 1 to about 3 parts of the peroxy compound, from about 1 to about 3 parts of the reaction initiator and enough water to make up 100 parts, where all amount are in parts by weight.

It has been found that surprisingly superior results can be obtained when the blowing agent is prepared by mixing together about 49 parts of Cylacell™, about 1.5 parts of the peroxy compound, about 2 parts of the reaction initiator and enough water to make up 100 parts, where all amounts are in parts by weight. When hydrogen peroxide is used as the peroxy compound and sodium bicarbonate is the reaction initiator, the superior results can be obtained from the blowing agent prepared by mixing about 49 parts of Cylaccell™, about 1.5 parts of hydrogen peroxide, about 2 parts of sodium bicarbonate and enough water to make up 100 parts, where all amounts are parts by weight.

For products in which a desiccant is an ingredient and wherein sodium silicate and magnesium trisilicate pentahydrate are the metal silicates and the boric acid or borate is sodium tetraborate pentahydrate, the ingredients of the blowing agent are intermixed in the following proportions (all amounts refer to parts by weight of the stated ingredient per 100 parts of the total weight of all ingredients): preferably from about 37 to about 46 parts of sodium silicate, from about 2 to about 3 parts of magnesium trisilicate pentahydrate, from about 3 to about 4 parts sodium tetraborate pentahydrate, from about 1 to about 3 parts of the peroxy compound, from about 0.5 to about 3 parts of the reaction initiator, from about 0.5 to about 3 parts of the desiccant and enough water to make up 100 parts. When hydrogen peroxide is used as the peroxy compound and sodium bicarbonate as the reaction initiator, it has been found that surprisingly superior results can be obtained when the composition of the mixture is about 42 parts sodium silicate, about 2.5 parts magnesium trisilicate pentahydrate, about 1.5 parts hydrogen peroxide, about 2 parts sodium bicarbonate about 2 parts desiccant and enough water to make up 100 parts.

When a desiccant is included in the blowing agent and Cylacell™ is used as the source of the silicates and the boric acid or borate salts, a preferred method for preparing the blowing agent is to mix from about 45 to about 50 parts of CylacellTM, from about 1 to about 3 parts of the peroxy compound, from about 1 to about 3 parts of the reaction initiator, from about 1 to about 3 parts of the desiccant, and enough water to make up 100 parts, where all amounts are in parts by weight. A more preferable method is to mix about 48 parts by weight of Cylacell™, about 1.5 parts of the peroxy compound, about 2 parts of the reaction initiator, about 2 parts of the desiccant, and enough water to make up 100 parts, where all amounts are in parts by weight.

When hydrogen peroxide is used as the peroxy compound and sodium bicarbonate is the reaction initiator, a blowing agent that yields surprisingly superior results can be prepared by mixing about 48 parts of Cylacell™, about 1.5 parts of hydrogen peroxide, about 2 parts of sodium bicarbonate, about 2 parts of the desiccant and enough water to make up 100 parts, where all amounts are parts by weight.

The ingredients of the blowing agent are mixed together in one or more steps to produce the desired dry dilatent gel blowing agent. If only one mixing step is used, all ingredients are added to the mixer at more-or-less the same time and intermixed until the materials are thoroughly incorporated and the mixture appears to the eye to have a homogeneous color and texture. There is no specific length of time that the mixing must be continued, but a period of several minutes, for example, from about one to about 10 minutes, is normal. The mixing can be carried out with the ingredients at any temperature between about 40° F. and about 120° F., but is preferably done at room temperature, for example, at between about 60° F. and about 90° F. Care must be taken that the temperature during preparation of the blowing agent does not approach the temperature at which the gas-producing reaction that is depended upon to foam the polymer is initiated (the "activation temperature"). After this mixing step is completed, the mixture is allowed to sit without further mixing until the ingredients have formed the final blowing agent product. Typically, after the mixing step is complete, the mixture foams and the total volume of the mixture increases several-fold. As further time elapses, the volume of the foamed product slowly decreases as the foam collapses. After the foam has substantially totally collapsed, the mixture assumes its final physical form, which can be described as having the appearance of a solid that is dry, or slightly "oily", to the touch with substantially no standing liquid in contact with it and which will fracture upon the application of sufficient shear stress, but will slowly flow at room temperature and under the influence of gravity to assume the shape of any container into which it is placed and two or more pieces will coalesce. Such a physical form will be termed herein a "dry dilatent gel". Under normal ambient conditions, a time of approximately 48 hours is required after the mixing step for the product to reach the form of a dry dilatent gel.

Although the subject blowing agent can be prepared with only one mixing step, it is preferred that the product be prepared by using at least two mixing steps. In this preferred method, a first mixing step is followed by a period of no mixing. The mixture is then mixed again and this second mixing step is again followed by a period of no mixing. The subsequent mixing step and rest period can be repeated as many times as desired, but it is preferred that a total of about four mixing/rest periods be used. The advantage of the multiple mixing/rest method is that the time required for the product to reach its final physical form is significantly shorter than if only one mixing is used. For example, with the use of four mixing/rest periods at ambient temperature, rather than one, the total time for formation of the final product is reduced from about 48 hours to about 24 hours.

If at least two mixing steps are used, the metal silicate and/or silicates, the boric acid or borate salt and the peroxy compound are intermixed with water at the first mixing step. Mixing is continued until the materials are thoroughly intermixed and appear to the eye to be a mixture with homogeneous color and texture. There is no specific time for this or any other mixing step, but each mixing step can be a period of several minutes, for example, from about one to about 10 minutes. Mixing can be carried out with the ingredients at any temperature between about 40° F. and about 120° F., but is preferably done at room temperature, for example, at between about 60° F. and about 90° F. If the optional desiccant is to be used in the blowing agent, all, or a part of the desiccant can be added prior to or during the first mixing. It has surprisingly been found that if the blowing agent is to be used in nitrile rubbers, it is preferable that all of the desiccant be added at the time of the first mixing. However, if the blowing agent is to be used with EPDM rubbers, it is preferred that a portion of the desiccant be added at the first mixing and the remainder added at the second mixing. If only a part of the desiccant is added at the time of the first mixing, it is preferred to add about 60% by weight of the desiccant at that time.

After the first mixing, the mixture is allowed to rest for a period of time in which no mixing takes place. The rest period is preferably for about 3–6 hours and more preferably for about 5 hours.

At the end of the first rest period, the mixture is again mixed as in the first mixing. If a desiccant is being used and only part of the desiccant was added at the first mixing step, the remainder of the desiccant can be added during this second mixing. After the second mixing is completed, the mixture is again allowed to rest for a period of time, preferably for about 6–9 hours and more preferably for about 7 hours.

At the end of the second rest period, the mixture is again mixed as before and after the third mixing is completed, the mixture is again allowed to rest for a period of time, preferably for about 3–9 hours and more preferably for about 6 hours.

At the end of the third rest period, the mixture is again mixed as before and after the fourth mixing is completed, the mixture is again allowed to rest for a period of time, preferably for about 1–12 hours and more preferably for about 6 hours. After this fourth rest period, the blowing agent should have reached the desired dry dilatent gel form as described above. The total time for the four mixing and rest periods should be about 24 hours.

To summarize this preferred mixing procedure: the mixing is carried out in four mixing steps, namely in a first, a second, a third and a fourth mixing step. It is preferred that the second mixing step be carried out about 5 hours after the completion of the first mixing step; the third mixing step is carried out about 12 hours after the completion of the first mixing step, the fourth mixing step is carried out about 18 hours after completion of the first mixing step and a period of no mixing is carried out for about 6 hours after the fourth mixing step.

The method that is described above for multiple mixing/rest periods is for a preparation that is carried out at normal room temperature, preferably about 60° F. to about 90° F. The method can be carried out at a temperature that is either colder or warmer than normal room temperature, but the total time for the preparation may be somewhat lengthened or shortened, respectively, due to the difference in temperature. In any embodiment of the method for preparing the blowing agent, it is important that the final product be brought to a point where it has the same dry dilatent gel form as is described above.

When the blowing agent has reached its final physical form, it is ready for use or for packaging, shipment, sale or storage. The blowing agent may be formed into any desired shape that is convenient for use or shipment, but it should be remembered that the blowing agent will slowly flow to assume the shape of any container in which it is contained. If it is desirable, the novel blowing agent can be dried further to provide a solid that does not possess dilatent rheological properties and does not coalesce.

An advantage of the novel blowing agent is that it will produce foamed products having substantially the same bulk density as those produced by using conventional commercial azide blowing agents, but at significantly lower dosage rates than conventionally used with azides. By way of example, the present blowing agent, when used in an amount that is approximately one-fourth to one-third of the amount of conventional commercial azo- or azide blowing agent, will result in a foamed product having substantially the same bulk density as that produced with the greater amount of the azo- or azide blowing agent.

Another advantage is that gas generation activity of the subject blowing agent is triggered by temperature, rather than by chemical additive. Thus, the material is stable at ambient temperatures and no additional mixing of a catalyst or initiator is required to prepare the blowing agent for use. Moreover, after blowing is completed and the foamed product has been cooled, there are no residual catalysts or initiators that would continue to react with the potential for damaging the finished product.

Because the novel blowing agent becomes a liquid, or softened solid at typical compounding temperatures (i.e., about 140° F.), it is more easily and more homogeneously dispersible throughout the polymer during compounding than particulate-type blowing agents. The subject blowing agent can be added to the polymer during compounding in relatively large pieces that liquefy or soften upon heating and are thereafter easily blended. But nonsoftening solid blowing agents must be ground to extremely fine particle size. For example, the silicate-based blowing agent of U.S. Pat. No. 5,612,386 must be ground to a mean particle size of less than about 45 microns, with the preferred mean particle size being smaller than about 40 microns, to insure adequate performance.

In physical form, the subject blowing agent is a dry dilatent gel at room temperature. Benefits of this form are ease in packaging, shipping, handling and storing, as well as the ease in compounding that is described above. The product is functionally stable for at least a period of one week, preferably one month, more preferably 90 days. By functionally stable, it is meant that the product's ability to function as a blowing agent under normal conditions of use does not substantially decrease over time from such ability at the time of preparation of the product.

The subject blowing agent is slightly alkaline. It is commonly known that excess alkalinity can be a factor in causing cure reversion in some rubbers. However, when the subject blowing agent is used, excess alkalinity can easily be remedied by balancing the pH of the blowing stock during compounding by the selection of proper fillers and additives. One of ordinary skill can easily balance pH without undue or extensive experimentation as a part of the preparation of a suitable blowing stock.

The subject blowing agent is useful as a blowing agent, or as one of several blowing agents, for the production of a foam from any type of polymer that is conventionally used to produce a foam. Preferred foamable polymers for use with the present blowing agent are rubbers and other thermoplastic and thermoset polymers.

Thermoplastic polymers that are suitable for use in this invention can vary widely. Illustrative of such foamable polymers are polyesters such as polyglycolic acid, polyethylene succinate, polyethylene adipate, polytetramethylene adipate, polyethylene azelate, polyethylene sebecate, polydecamethylene adipate, polydecamethylene sebacate, poly-$\alpha,\alpha$-dimethylpropiolactone, polypivaloyl lactone, polyparahydroxybenzoate, polyethylene oxybenzoate, polyethylene isophthalate, polyethylene terephthalate, polydecamethylene terephthalate, polyhexamethylene terephthalate, poly-1,4-cyclohexane dimethylene terephthalate, polyethylene-1,5-naphthalate, polyethylene-2,6-naphthalate, poly-1,4-cyclohexylidene dimethyleneterephthalate and the like; polyamides such as poly-4-aminobutyric acid, poly-6-aminohexanoic acid, poly-7-aminoheptanioc acid, poly-8-aminooctanoic acid, poly-9-aminonanonoic acid, poly-10-aminodecanoic acid, poly-11-aminoundecanoic acid, poly-12-aminododecanoic acid, polyhexamethyleneadipamide, polyheptamethylene pimelamide, polyoctamethylene suberamide, polyhexamethylene sebacamide, polynanomethylene azelamide, polydecamethylene azelamide, polydecamethylene sebacamide, poly-bis-4-aminocyclohexyl-methane-1,10-decanedicarboxamide, poly-m-xylene-adipamide, poly-p-xylene-sebacamide, poly-2,2,2-trimethylhexamethylene terephthalamide, polypiperazine sebacamide, polymetaphenylene isophthalamide, poly-p-phenylene terephthalamide, and the like; polycarbonates such as polymethane bis-4-phenyl carbonate, poly-1,1-ethane bis-4-phenyl carbonate, poly-2,2-propane bis-4-phenyl carbonate, poly-2,2-propane bis-4-phenylcarbonate, poly-1,1-butane bis-4-phenyl carbonate, poly-1,1,2-methyl propane bis-4-phenyl carbonate, poly-2,2-butane bis-4-phenylcarbonate, poly-2,2-pentane bis-4-phenylcarbonate, poly-4,4-heptane bis-4-phenylcarbonate, poly-1,1-1-phenylethane bis-4-phenylcarbonate, polydiphenylmethane bis-4-phenylcarbonate, poly-1,1-cyclopentane bis-4-phenylcarbonate, poly-1,1-cyclohexane bis-4-phenylcarbonate, polythio bis-4-phenylcarbonate, poly-2,2-propane bis-4-2-methylphenylcarbonate, poly-2,2-propane bis-4-2-chlorophenylcarbonate, poly-2,2-propane bis-4-2,6-dichlorophenylcarbonate, poly-2,2-propane bis-4-2,6-dibromophenylcarbonate, poly-1,1-cyclohexane bis-4-2,6-dichlorophenylcarbonate, and the like; polymers derived from the polymerization of $\alpha$, $\beta$-unsaturated monomers such as polyethylene, acrylonitrile/butadiene/styrene terpolymer, polypropylene, poly-1-butene, poly-3-methyl-1-butene, poly-1-pentene, poly-4-methyl-1-pentene, poly-1-hexene, poly-5-methyl-1-hexene, poly-1-octadecene, polyisobutylene, polyisoprene, 1,2-poly-1,3-butadiene(iso), 1,2-poly-1,3-butadiene(syndio), polystyrene, poly-α-methylstyrene, poly-2-methylstyrene, poly-4-methylstyrene, poly-4-methoxystyrene, poly-4-phenylstyrene, poly-3-phenyl-1-propene, poly-2-chlorostyrene, poly-4-chlorostyrene, polyvinyl fluoride, polyvinyl chloride, polyvinyl bromide, polyvinylidene fluoride, polyvinylidene chloride, polytetrafluoroethylene, polychlorotrifluoroethylene, polyvinylcyclopentane, polyvinylcyclohexane, poly-α-vinylnaphthalene, polyvinyl alcohol, polyvinylmethyl ether, polyvinyl ethyl ether, polyvinyl propyl ether, polyvinyl isopropyl ether, polyvinyl butyl ether, polyvinyl isobutyl ether, polyvinyl sec.-butyl ether, polyvinyl tert.-butyl ether, polyvinyl hexyl ether, polyvinyl octyl ether, polyvinyl methyl ketone, polymethyl isopropenyl ketone, polyvinyl formate, polyvinyl acetate, polyvinyl propionate, polyvinyl chloroacetate, polyvinyl trifluoroacetate, polyvinyl benzoate, poly-2-vinylpyridine, polyvinylpyrrolidone, polyvinylcarbazole, polyacrylic acid, polymethyl acrylate, polyethyl acrylate, polypropyl acrylate, polyisopropyl acrylate, polybutyl acrylate, polyisobutyl acrylate, polysec.-butyl acrylate, polytert.-butyl acrylate, polymethacrylic acid, polymethyl methacrylate, polyethyl methacrylate, polypropyl methacrylate, polyisopropyl methacrylate, polybutyl methacrylate, polyisobutyl methacrylate, polysec.-butyl methacrylate, polytert.-butyl methacrylate, poly-2-ethylbutyl methacrylate, polyhexyl methacrylate, polyoctyl methacrylate, polydodecyl methacrylate, polyoctadecyl methacrylate, polyphenyl methacrylate, polybenzyl methacrylate, polycyclohexyl methacrylate, polymethyl chloroacrylate, polyacrylonitrile, polymethacrylonitrile, polyacrylamide, poly N-isopropylacrylamide, and the like; polydienes such as poly-1,3-butadiene(cis), poly-1,3-butadiene(trans), poly-1,3-butadiene(mixt.), poly-1,3-pentadiene(trans), poly-2-methyl-1-1,3-butadiene(cis), poly 2-methyl-1,3-butadiene (trans), poly-2-methyl-1,3-butadiene(mixt.), poly-2-tert.-butyl-1-1,3-butadiene(cis), poly-2-chloro-1,3-butadiene (trans), poly-2-chloro-1,3-butadiene(mixt.) and the like; polyoxides such as polymethylene oxide, polyethylene oxide, polytetramethylene oxide, polyethylene formal, polytetramethylene formal, polyacetaldehyde, polypropylene oxide, polyhexene oxide, polyoctene oxide, polytrans-2-butene oxide, polystyrene oxide, poly-3-methoxypropylene oxide, poly-3-butoxypropylene oxide, poly-3-hexoxypropylene oxide, poly-3-phenoxypropylene oxide, poly-3-chloropropylene oxide, poly-2,2-bischloromethyl-trimethylene-3-oxide, poly-2,6-dimethyl-1,4-phenylene oxide, PPO, poly-2,6-diphenyl-1,4-phenylene oxide, and the like, polysulphides such as polypropylene sulphide, polyphenylene sulphide and the like; polysulfones such as poly-4,4'-isopropylidene diphenoxydi-4-phenyle sulphone; noryl, and the like, and/or mixtures thereof.

Examples of thermoset polymers for use with the subject blowing agent include urethanes, isocyanurates, phenolics, silicones, and urea formaldehydes.

Particularly preferred as foamable polymers for use with the subject blowing agent are rubbers, such as natural rubber (polyisoprene) and synthetic rubbers. Illustrative of useful synthetic rubbers are sodium polysulfide, polychloroprene (neoprene), butadiene-styrene copolymers (SBR), acrylonitrilebutadiene copolymers (nitrile rubber), hydrogenated nitrile butyl rubber (HNBR), ethylenepropylene-diene (EPDM) rubbers, synthetic polyisoprene, butyl rubber, polyacrylonitrile, silicone, epichlorohydrin and polyurethane.

The subject blowing agent can be used for the creation of a foam of any type. For example, both open cell and closed cell foams can be produced by using the subject blowing agent. However, it has been found that the blowing agent is particularly useful for the production of flexible, closed cell foams having a density of between about 4 lbs/cu ft. and about 40 lbs/cu ft. in which the foamed structure has been formed by the novel blowing agent.

The blowing agent of the present invention can be used in the same manner as any other liquid or solid blowing agent that generates gas in situ by chemical decomposition. In a conventional application, the blowing agent would be thoroughly intermixed with the polymer to be foamed and other additives. Such mixing is termed "compounding" and the foamable composition that includes the polymer, the blowing agent and other ingredients after compounding is termed the "blowing stock". A novel foamable composition can be prepared that comprises at least one metal silicate, boric acid or salt thereof, a peroxy compound, a reaction initiator and water intermixed throughout a foamable polymer. Optionally, the foamable composition can contain a desiccant. The novel foamable compositions of the present invention are most advantageously used when the foamable polymer is a rubber.

Any type of mixing equipment can be used to compound the blowing stock. It is preferred that the mixing equipment have non-metallic mixing surfaces and is of the type that is conventionally used to blend solids, or very high viscosity, pastes, liquids or gels, such as blenders that are used to compound rubber or other high polymers. Examples of such blenders are Banbury mixers, pug mills, multiple roll mills, muller mills, twin rotor mills, or mixer extruders.

The amount of the blowing agent that can be used to generate a foamed polymer varies considerably and depends upon, among other things, the desired density of the final foam. It is typical that bulk density of foamed rubbers, for example, varies from about 4 lbs/cu.ft. to over 40 lbs/cu.ft. As would be expected, the lower bulk density that is desired in the final foamed polymer, the more blowing agent is included in the blowing stock. In the case of conventional azo- and azide blowing agents, typical use rates could vary from as little as about 7 parts blowing agent by weight per 100 parts of rubber, for foamed polymers having a high bulk density, to as much as about 40 parts blowing agent by weight per 100 parts of rubber, for foamed polymers having a low bulk density.

The use rate for the novel blowing agent disclosed herein is typically lower than the use rate for a conventional azo- or azide agent while still achieving a similar bulk density and is preferably from about 25% to about 35% of the use rate of an azo- or azide blowing agent. In order to achieve the same bulk densities as the azo- or azide-blown foams described above, for example, the subject blowing agent would be used at a rate of about 1.5–2.5 parts per 100 parts of rubber, for higher density foams, up to about 10–14 parts per 100 parts of rubber, for lower density foams. Benefits of being able to use less of the subject blowing agent to obtain the same bulk density as conventional blowing agents are the reduced cost of using a lesser amount of the subject blowing agent; physical properties of the rubbers are less effected by the presence of the blowing agent when lower amounts are used; and compounding is easier when less of the blowing agent has to be distributed throughout the polymer to be foamed.

Other components of the blowing stock can be added at any time during compounding. Such other components can be fillers or extenders, such as carbon black; other polymers (for example, polyvinyl chloride) and oils; curing agents, such as sulfur compounds and various chemicals that act as a part of a curing system, such as zinc oxide; antioxidants; antistatic agents; biocides; colorants; coupling agents; emulsifiers; fibrous reinforcements; flame retardants; fungicides; heat stabilizers; lubricants; mold release agents; plasticizers; preservatives; processing aids; slip agents; ultraviolet stabilizers; viscosity depressants; and any other ingredient that is a desirable component of the final foamed product.

Compounding is most often done at increased temperature. As discussed previously, an advantage of the present blowing agent is its property of softening or melting at a temperature of about 140° F. while retaining its functional characteristics. The molten or softened blowing agent is more easily dispersed in the rubber during compounding than a hard particulate material. This results in a more homogeneous and consistent distribution of the blowing agent in the rubber prior to blowing, which leads to a foam with a more homogeneous and consistent cell distribution.

The blended blowing stock is then typically heated so that the temperature is raised to the activation temperature of the blowing agent. The heating period can be for a period of a few minutes, typically from less than one to about 30 minutes, during which time the gas generated by the reaction of the blowing agent expands to form cells within the polymer. The activation temperature for the present blowing agent is at least about 220° F. and is preferably within a range of from about 220° F. to about 290° F., more preferably from about 230° F. to about 260° F., even more preferably from about 235° F. to about 245° F. and most preferably about 240° F.

The blowing step can be carried out in either a mold or an extruder, depending upon the type of foamed product that is desired. If an extruder is used, the foamed material exiting the extruder can be passed through one or more ovens, salt baths, or other type of additional processing step prior to completion into a product of normal commerce.

Products that result from the use of the blowing agent and the process for blowing foams are open cell or closed cell foamed polymers that are either rigid or flexible. An example of a flexible open cell foam product is carpet backing material. Examples of flexible closed cell foam products are foam rubbers that are used in automotive parts such as die cut parts, flexible weather seals, pillar plugs; in garage door seals; foamed gaskets and seals and other similar applications. Foamed products with bulk densities of from about 4 lbs/cu ft. to about 40 lbs/cu ft. are typically produced by using the present blowing agent.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This illustrates the preparation of a blowing agent of the present invention.

Into a large polyethylene pail were placed hydrogen peroxide (2 lbs, of 3% by weight commercial hydrogen peroxide aqueous solution containing 0.001% by weight phosphoric acid), Cylacell™ (2 lbs, powder as received from Cylatec, 3711 Whipple Ave., Canton, Ohio 44718), and sodium bicarbonate (60.84 g, commercial baking powder). The materials were mixed by hand with a plastic stirring rod for two minutes, or until the mixture appeared to the eye to be homogeneous in texture and color. When the materials were mixed it was noticed that a slight exotherm occurred and the temperature of the mixture increased slightly. The mixture was permitted to rest without mixing and it increased in volume to about 3 or 4 times its original volume. After 6 hours, the mixture was stirred again and the volume returned to the original volume as gas was released. After 6 additional hours of rest, the mixture again had expanded to about 2 times its original volume. The mixture was again agitated and the volume again decreased to the original volume. The stirring was repeated at 16 hours from the starting time. After the expiration of 24 hours from the start of mixing, the mixture had reached its final form of a dry dilatent gel and was ready for use as a blowing agent.

EXAMPLE 2

This illustrates the preparation of the silicate-based blowing agent with varying ratios of Cylacell™ to $H_2O_2$.

Ingredients similar to those described in Example 1 were intermixed in varying amounts in order to determine the limits of inclusion of the several ingredients in the blowing agent. Suitability of the blends was determined on the basis of the appearance of the final product that was formed and, specifically, how closely the final product matched the desired dry dilatent gel. The amount of the various ingredients in Table 1 are all given in percent by weight of the total ingredients added.

TABLE 1

Attempts to form the subject blowing agent with varying blends of components.

| BATCH | CYLACELL ™ (%) | HYDROGEN PEROXIDE (%) | SODIUM BICARBONATE (%) | CALCIUM OXIDE (%) | ALUMINUM SULFATE (%) | APPEARANCE AND FORM OF FINAL PRODUCT |
|---|---|---|---|---|---|---|
| A | 42.9 | 57.1 | 0 | 0 | 0 | Grayish color; flows together after split up; oily touch; |
| B | 46.8 | 53.2 | 0 | 0 | 0 | Not quite solidified after 3 days; |
| C | 63 | 37 | 0 | 0 | 0 | Immediate solidification; |
| D | 56 | 44 | 0 | 0 | 0 | Solidified too quickly; |
| E | 51 | 49 | 0 | 0 | 0 | Gelled after 4 hours; |
| F | 36 | 54 | 9 | 0 | 0 | Set up after one hour; |
| G | 46 | 46 | 8 | 0 | 0 | Set up after 15 min.; |

TABLE 1-continued

Attempts to form the subject blowing agent with varying blends of components.

| BATCH | CYLACELL ™ (%) | HYDROGEN PEROXIDE (%) | SODIUM BICARBONATE (%) | CALCIUM OXIDE (%) | ALUMINUM SULFATE (%) | APPEARANCE AND FORM OF FINAL PRODUCT |
|---|---|---|---|---|---|---|
| H | 48 | 48 | 4 | 0 | 0 | Formed dry dilatent gel after 2 or 3 days; |
| I | 48.75 | 48.75 | 2.5 | 0 | 0 | Formed dry dilatent gel after 2 days; |
| J | 49 | 49 | 2 | 0 | 0 | Formed dry dilatent gal after 2 days or 24 hours with multiple mixing steps; |
| K | 48 | 48 | 2 | 2 | 0 | Formed dry dilatent gal after 2 days or 24 hours with multiple mixing steps; |
| L | 48 | 48 | 2 | 0 | 2 | Formed dry dilatent gal after 2 days or 24 hours with multiple mixing steps; |

EXAMPLE 3

This illustrates the use of the blowing agent to produce a foamed rubber product.

A nitrile rubber-based blowing stock was compounded by adding the following ingredients to a laboratory-scale Banbury mixer having a total capacity of approximately 2000 grams: nitrile rubber (501.84 grams; Paracril BJLT M50, available from Uniroyal Chemical Co.), PVC resin (250.92 grams, 5305 PVC resin available from Vista Chemical Co.), carbon black (50.18 grams, type N550, available from Cabot Corp.), calcium carbonate (501.84 grams, Atomite™, available from ECC International), magnesium oxide (15.06 grams, available from U.S. Zinc, Elastochem, or Harwick Chemical), stearic acid (30.11 grams, Emersol 132, available from Henkel Co.), Carbowax® (10.04 grams, polyethylene glycol, available from Union Carbide), organophosphite alkylphenol mixture (5.02 grams, Therm-Chek 904, available from Ferro Co.), epoxified soy oil (50.18 grams, available from ELF Atochem), butyl benzyl phthalate (250.92 grams, Sanitizer 160, available from Monsanto Chemical Co.), synthetic triaryl phosphate (150.55 grams, available from FMC, AKZO, or Monsanto Chemical Co.). The total charge to the mixer was 1,866.84 grams.

The ingredients were mixed until the temperature of the mixture reached 230° F. and then G2000 (50.18 grams, silicate-based blowing agent as prepared in Example 1) was added to the mixture in the blender and mixing continued until a total mixing time of 5 minutes elapsed. When the blowing stock temperature reached 240° F., the mixture was removed from the blender and cooled on a 12" lab finishing mill to room temperature. After 24 hours at room temperature, accelerators and sulfur/sulfur donors were added to the blowing stock on the 12" lab mill and the stock was mixed for from 3 to 4 minutes. In this case 2-mercaptobenzothiazole (MBT; 9.3 gms), dipentamethylenethiuram tetrassulfide (DPTT; 6.2 gms), zinc-dimethyldithiocarbamate (ZDMC; 6.2 gms) were added as accelerators and 12.4 gms sulfur was added as the sulfur donor. The blowing stock was then foamed by heating at 200° F. for 4 minutes in a set velocity hot air oven (although the heating could also be done in a variable velocity hot air oven, a liquid salt bath, or a microwave oven) and finished at 280° F. for 5 minutes. After this final heating the foamed rubber was cooled to room temperature.

In view of the above, it will be seen that the several advantages of the invention are achieved and other advantageous results obtained.

As various changes could be made in the above methods and compositions without departing from the scope of the invention, it is intended that all matter contained in the above description shall be interpreted as illustrative and not in a limiting sense.

What is claimed is:

1. A foamable composition comprising at least one metal silicate; boric acid or salt therof, a peroxy compound; a reaction initiator; and water intermixed throughout a foamable polymer.

2. A foamable composition as set forth in claim 1, further comprising a desiccant.

3. A foamable composition as set forth in claim 2, wherein the foamable polymer is a rubber.

4. A process for preparing a foamed polymer from a foamable composition having an activation temperature and comprising at least one metal silicate, boric acid or a salt thereof, a peroxy compound, a reaction initiator, and water intermixed throughout a foamable polymer, the process comprising heating the foamable composition to its activation temperature thereby causing the foamable composition to generate gas, thus creating gas cells throughout the polymer resulting in a foamed polymer.

5. A process as set forth in claim 4, wherein the foamable composition is prepared by mixing together into a blowing agent at least one metal silicate, boric acid or a salt thereof, a peroxy compound, a reaction initiator and water and mixing the blowing agent into the foamable polymer.

6. A process as set forth in claim 5, wherein the foamable composition further comprises a desiccant.

7. A process as set forth in claim 4, wherein the activation temperature is about 240° F.

8. A process as set forth in claim 7, wherein the foamed polymer product has a density of between about 4 lbs/cu.ft. and about 40 lbs/cu.ft.

9. A foamed polymer having a density of between about 4 lbs/cu ft. and about 40 lbs/cu ft., in which the foamed structure has been formed by the blowing agent as set forth in claim 1.

10. A foamed polymer as set forth in claim 9, wherein the foamed polymer is a flexible, closed cell foamed polymer.

* * * * *